(12) United States Patent
Klouda

(10) Patent No.: US 6,755,121 B2
(45) Date of Patent: Jun. 29, 2004

(54) COOKING CHAMBER WITH EXCESS PRESSURE AND/OR LOW PRESSURE

(75) Inventor: Jaroslav Klouda, Fuerstenfeldbruck (DE)

(73) Assignee: Rational AG, Landsberg/Lech (DE)

( * ) Notice: Subject to any disclaimer, the term of this patent is extended or adjusted under 35 U.S.C. 154(b) by 249 days.

(21) Appl. No.: 09/915,067

(22) Filed: Jul. 25, 2001

(65) Prior Publication Data
US 2002/0017288 A1 Feb. 14, 2002

(30) Foreign Application Priority Data
Aug. 3, 2000 (DE) .......................................... 100 37 905

(51) Int. Cl.[7] .......................... A47J 27/00; A47J 27/04; A23L 1/00
(52) U.S. Cl. .............................. 99/330; 99/352; 99/468; 99/473; 99/476
(58) Field of Search ................... 99/326–333, 352–355, 99/444–450, 339, 467, 468, 473–476; 126/20, 21 A, 369, 369.1; 219/401, 400; 426/510, 511, 523

(56) References Cited

U.S. PATENT DOCUMENTS 3,744,474 A * 7/1973 Shaw .......................... 126/20
4,506,598 A * 3/1985 Meister ....................... 99/330

FOREIGN PATENT DOCUMENTS

| DE | 29 12 871 | 11/1979 |
| DE | 37 41 975 | 6/1989 |
| DE | 44 03 386 | 6/1995 |
| DE | 38 21 205 | 12/1998 |
| DE | 298 21 158 | 5/2000 |
| DE | 200 02 833 | 7/2000 |
| EP | 0 319 673 | 10/1988 |
| EP | 0 666 046 | 12/1994 |

* cited by examiner

Primary Examiner—Timothy F. Simone
(74) Attorney, Agent, or Firm—Schiff Hardin LLP

(57) ABSTRACT

In a cooking chamber for a cooking device with at least one opening discharging into at least one pipe to a discharge and/or exhaust, at least one blower for generating excess pressure and/or low pressure in the cooking chamber is arranged in the at least one opening and/or in the at least one pipe.

10 Claims, 1 Drawing Sheet

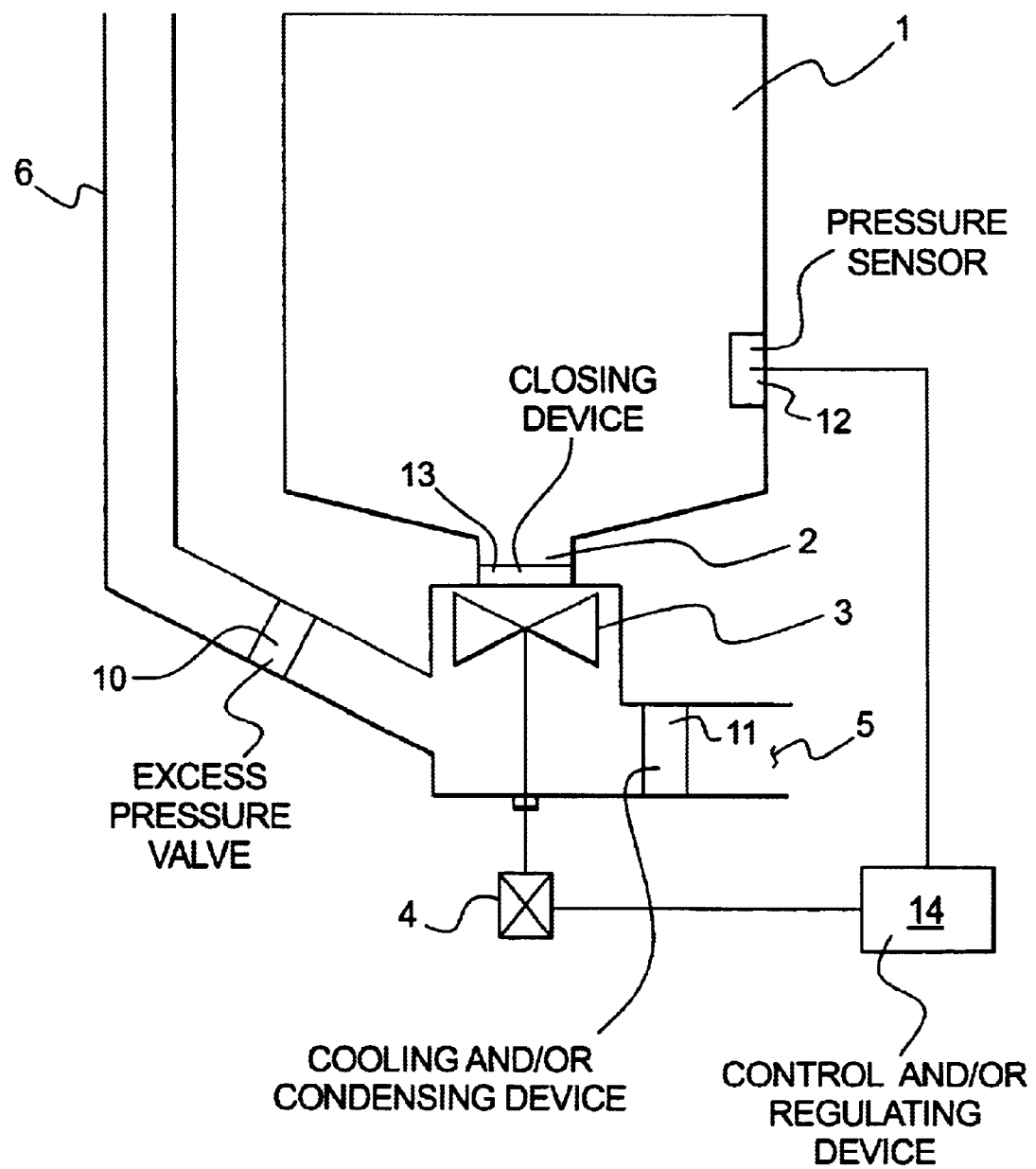

COOKING CHAMBER WITH EXCESS PRESSURE AND/OR LOW PRESSURE

BACKGROUND OF THE INVENTION

The present invention relates to a cooking chamber for a cooking device having at least one opening discharging into at least one pipe to discharge and/or exhaust.

Cooking chambers for cooking devices are generally known and come in different embodiments with different components. Cooking devices known from the prior art have a cooking chamber separated from a ventilator space, for example. A blower circulating the air within the cooking chamber is arranged in this ventilator space.

German Patent 200 02 833.2 discloses a cooking device having a cooking chamber that can be closed, whereby a closing device for the cooking chamber, dependent on the state of the cooking chamber atmosphere, can be controlled and/or regulated for closing or opening the cooking chamber vis-a-vis the environment.

The prior art also discloses what are referred to as pressure cooking devices, which cook foods by using steam (see German Patent 291 28 71 A1, for example). These cooking devices can be divided into two groups. In the first group, a required amount of water is introduced into the cooking chamber in addition to the receptacles with the cooking product, and the steam is indirectly generated by suppling heat from outside in order to vaporize the water that is present in the cooking chamber. In the second group, steam from an outside steam generator is fed via a pipe into the cooking chamber and condensate arising during the cooking process is let out via a condensate separator.

A disadvantage of the cooking chambers known from the prior art is that the heat transmission from the heat sources onto the cooking product is not satisfying. Moreover, the dehumidification of the cooking chamber is mostly insufficient given a steam operation and/or an operating mode of the cooking device releasing lots of moisture, so that cooking results can be dissatisfying.

SUMMARY OF THE INVENTION

An object of the present invention is to further develop the cooking chamber of this type such that the disadvantages of the prior art are overcome, particularly a clear improvement of the heat transmission from the water sources onto the cooking product, so that less energy is necessary for obtaining a specific cooking result and the removal of moisture, which is not desired in the cooking chamber, in a simple way from the cooking chamber in order to improve the cooking result.

The object of the invention is achieved in that at least one blower for generating excess pressure and/or low pressure is arranged in the at least one opening and/or in the at least one pipe.

Furthermore, it is provided that liquid and/or moisture can be supplied to the cooking chamber and/or can be removed from the cooking chamber, in a preferably regulated fashion, via the at least one blower, such as in the form of a turbine wheel, a fan or the like.

A cooling device and/or condensing device is also proposed in the discharge.

An inventive solution is characterized by at least one closing device in the at least one opening, the discharge and/or the exhaust.

Furthermore, a control device and/or regulating device cooperating with the at least one blower, the cooling device and/or condensing device and/or the closing device is provided.

A further embodiment of the invention is characterized by at least one excess pressure valve cooperating with respect to the cooking chamber.

It is also suggested that a motor for driving the blower can be regulated and/or controlled via a pressure sensor situated in the cooking chamber or in communicating pipes in the cooking chamber.

Therefore, the invention is based on the surprising knowledge that the pressure conditions within the cooking chamber can be adjusted by the inventive arrangement of a blower in an opening and/or a feeding pipe of the cooking chamber such that generated excess pressure has a positive effect on the heat transmission from the heat source onto the cooking product and such that generated low pressure has a positive effect predominately with respect to the dehumidification of the cooking chamber.

Further features and advantages of the invention derive from the following specification explaining an exemplary embodiment of the invention in greater detail on the basis of a schematic drawing.

BRIEF DESCRIPTION OF THE DRAWING

The drawing FIGURE shows a block diagram of a cooking chamber according to the invention.

DESCRIPTION OF THE PREFERRED EMBODIMENTS

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The FIGURE shows an inventive cooking chamber 1 arranged within a cooking device (not shown). The cooking chamber 1 has an opening 2 leading to a discharge 5 and to an exhaust 6 via a blower 3, which can be driven via a motor 4.

The blower 3, such as a turbine wheel, is constructed such that it generates excess pressure in the cooking chamber 1 when it is operated in a direction of rotation, for example in the clockwise direction, but generates low pressure in the cooking chamber 1 when it is operated in the other direction of rotation, for example counterclockwise. Excess pressure has a positive effect, for example given what is referred to as a "pressure cooker", on the heat transmission from the heat source onto the cooking product and reduces the energy that is required for obtaining a desired cooking result. If the blower 3 generates excess pressure in the cooking chamber 1, it can be prevented by an excess pressure valve 10, which can be arranged in the exhaust, that the pressure becomes excessively high in the cooking chamber 1.

If the air blower 3 generates low pressure in the cooking chamber 1, moisture such as water, which was necessary during a steam operation of the cooking device, can be removed from the cooking chamber 1. This moisture is removed via the discharge 5. It is thereby possible that the discharge 5 also has a cooling device and/or condensing device 11 in order to support the discharge of the moisture from the cooking chamber. A closing device 13 may be provided in the opening 2, and/or alternatively in the discharge 5 and/or exhaust 6.

The motor 4 for driving the blower 3 can be regulated and/or controlled via a pressure sensor 12 connected to a control and/or regulating device 14, which can be arranged within the cooking chamber 1 or in communicating pipes (not shown) in the cooking chamber 1.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

I claim as my invention:

1. A cooking chamber system for a cooking device, comprising:
    a cooking chamber with at least one opening discharging into at least one pipe to at least one of a discharge and an exhaust; and
    at least one blower generating at least one of excess pressure and low pressure in the cooking chamber is arranged in at least one of the opening and the at least one pipe.

2. The cooking chamber system according to claim 1 wherein at least one of liquid and moisture is at least one of supplied to the cooking chamber and removed from the cooking chamber in a regulated fashion via the at least one blower, the blower comprising one of a turbine wheel and a fan.

3. The cooking chamber system according to claim 1 wherein at least one of a cooling device and a condensing device are provided in the discharge.

4. The cooking chamber system according to claim 1 wherein at least one closing device is provided in at least one of the opening, the discharge and the exhaust.

5. The cooking chamber system according to claim 1 wherein at least one of a control device and a regulating device cooperates with the at least one of the blower, a cooling device, a condensing device, and at least one closing device.

6. The cooking chamber system according to claim 1 wherein at least one excess pressure valve cooperates with the cooking chamber.

7. The cooking chamber system according to claim 1 wherein a motor driving the blower is at least one of regulated and controlled via a pressure sensor situated in one of the cooking chamber and in communicating pipes in the cooking chamber.

8. A cooking chamber system for a cooking device, comprising:
    a cooking chamber having an opening, said opening communicating with a moisture discharge and an exhaust;
    a blower motor in communication with the opening; and
    a motor for turning the blower in a first direction for generating excess pressure in the cooking chamber for pressure cooking with improved heat transmission from the heat source of the cooking chamber onto the cooking product and which reduces energy required for obtaining a desired cooking result, and in a second direction to create low pressure in the cooking chamber so that moisture necessary during steam operation of the cooking chamber is removed from the cooking chamber via the discharge.

9. The system of claim 8 wherein an excess pressure valve is arranged in the exhaust for releasing pressure which becomes excessively high in the cooking chamber during the pressure cooking.

10. The system of claim 8 wherein the opening is located at a bottom of the cooking chamber and wherein a widened portion below the opening contains the blower, and wherein the discharge and the exhaust are below the blower.

* * * * *